US008537398B2

(12) United States Patent
Burke, Jr.

(10) Patent No.: US 8,537,398 B2
(45) Date of Patent: Sep. 17, 2013

(54) METHODS AND SYSTEMS FOR TRACKING AND MANAGING PRINT DEVICE INVENTORY INFORMATION USING A CLOUD ADMINISTRATION SYSTEM

(75) Inventor: Robert William Burke, Jr., Stanley, NY (US)

(73) Assignee: Xerox Corporation, Norwalk, CT (US)

( * ) Notice: Subject to any disclaimer, the term of this patent is extended or adjusted under 35 U.S.C. 154(b) by 336 days.

(21) Appl. No.: 13/112,455

(22) Filed: May 20, 2011

(65) Prior Publication Data

US 2012/0293829 A1 Nov. 22, 2012

(51) Int. Cl.
*G06F 3/12* (2006.01)
*G06F 9/44* (2006.01)

(52) U.S. Cl.
USPC ........... 358/1.15; 717/169; 717/171; 717/173

(58) Field of Classification Search
None
See application file for complete search history.

(56) References Cited

U.S. PATENT DOCUMENTS

| | | | |
|---|---|---|---|
| 5,305,199 A | 4/1994 | LoBiondo et al. |
| 6,304,732 B1 | 10/2001 | Myers et al. |
| 6,647,222 B1 | 11/2003 | Digby et al. |
| 7,317,882 B2 | 1/2008 | Dombrowski |
| 7,574,496 B2 | 8/2009 | McCrory et al. |
| 7,587,146 B2 | 9/2009 | Horn |
| 7,649,638 B2 | 1/2010 | Beard et al. |
| 7,650,085 B2 | 1/2010 | Kehoe et al. |
| 7,667,874 B2 | 2/2010 | MacDonald et al. |
| 7,773,239 B2 | 8/2010 | Beard et al. |
| 1,004,720 A1 | 2/2011 | Mansoor et al. |
| 8,009,302 B2 | 8/2011 | Martin |
| 8,139,238 B2 | 3/2012 | Oki |
| 2010/0103445 A1 | 4/2010 | Levine et al. |
| 2010/0332629 A1 | 12/2010 | Cotugno et al. |
| 2011/0292431 A1 | 12/2011 | Cok |
| 2011/0292435 A1 | 12/2011 | Cok et al. |

OTHER PUBLICATIONS

B. Pellow, "Moving to the Cloud", Business Development Services Analysis, Nov. 2010, InfoTrends 2010, pp. 1-7.
A. Wawro, "Cloud Printers Rain on Security Parade", PC World, Apr. 2011, vol. 29, No. 4, p. 36.

*Primary Examiner* — Twyler Haskins
*Assistant Examiner* — Justin Katzwhite
(74) *Attorney, Agent, or Firm* — Fox Rothschild LLP

(57) ABSTRACT

A cloud administration system for managing inventory information for one or more remote print devices may include a processing module in communication with a plurality of print devices. The processing module may be located remotely from each of the plurality of print devices. The cloud administration system may include a storage module in communication with the processing module. The processing module may be configured to receive inventory information associated with a print device inventory item associated with a print device of the plurality of print devices, store the inventory information in the storage module, and enable an application computing device to access the inventory information from the storage module. The cloud administration system may operate as a shared resource for each of the plurality of print devices and the application computing device.

13 Claims, 5 Drawing Sheets

METHODS AND SYSTEMS FOR TRACKING AND MANAGING PRINT DEVICE INVENTORY INFORMATION USING A CLOUD ADMINISTRATION SYSTEM

CROSS-REFERENCE TO RELATED APPLICATIONS

This application is related to United States Patent Application Publication Numbers 2012/0293827 entitled "Method And System For Managing Print Jobs Using A Cloud Administration System", 2012/0293828 entitled "Method And System For Managing Print Device Information Using A Cloud Administration System", 2012/0297375 entitled "Methods And Systems For Providing Software Updates Using A Cloud Administration System", 2012/0293830 entitled "Method And System For Managing Print Device Information Using A Cloud Administration System", and 2012/0293831 entitled "Methods And Systems For Managing Print Device Licenses Using A Cloud Administration System" each filed on May 20, 2011.

BACKGROUND

Typically, print-related services and solutions require providing onsite resources to a customer, such as software, hardware and personnel. In addition, numerous print-related services and solutions may operate autonomously, even though they utilize similar delivery mechanisms and backend connectivity. As such, providing print-related services can often be costly and inefficient.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a cloud administration system for managing inventory information for one or more remote print devices may include a processing module in communication with a plurality of print devices. The processing module may be located remotely from each of the plurality of print devices. The cloud administration system may include a storage module in communication with the processing module. The processing module may be configured to receive inventory information associated with a print device inventory item associated with a print device of the plurality of print devices, store the inventory information in the storage module, and enable an application computing device to access the inventory information from the storage module. The cloud administration system may operate as a shared resource for each of the plurality of print devices and the application computing device.

In an embodiment, a system for managing inventory information for one or more remote print devices may include a cloud administration system. The cloud administration system may include a processing module in communication with a plurality of print devices. The processing module may be located remotely from each of the plurality of print devices. The cloud administration system may include a storage module in communication with the processing module. The processing module may be configured to receive inventory information associated with a print device inventory item for use in a print device of the plurality of print devices, and store the inventory information in the storage module. In an embodiment, the system may include an application computing device in communication with the cloud administration system. The application computing device may be configured to access the inventory information from the storage module of the cloud administration system, and update a master list of inventory information associated with a customer based on the accessed inventory information. The application computing device may be located remotely from the cloud administration system. The cloud administration system may operate as a shared resource for each of the plurality of print devices and the application computing device.

DETAILED DESCRIPTION

Figure 1A:
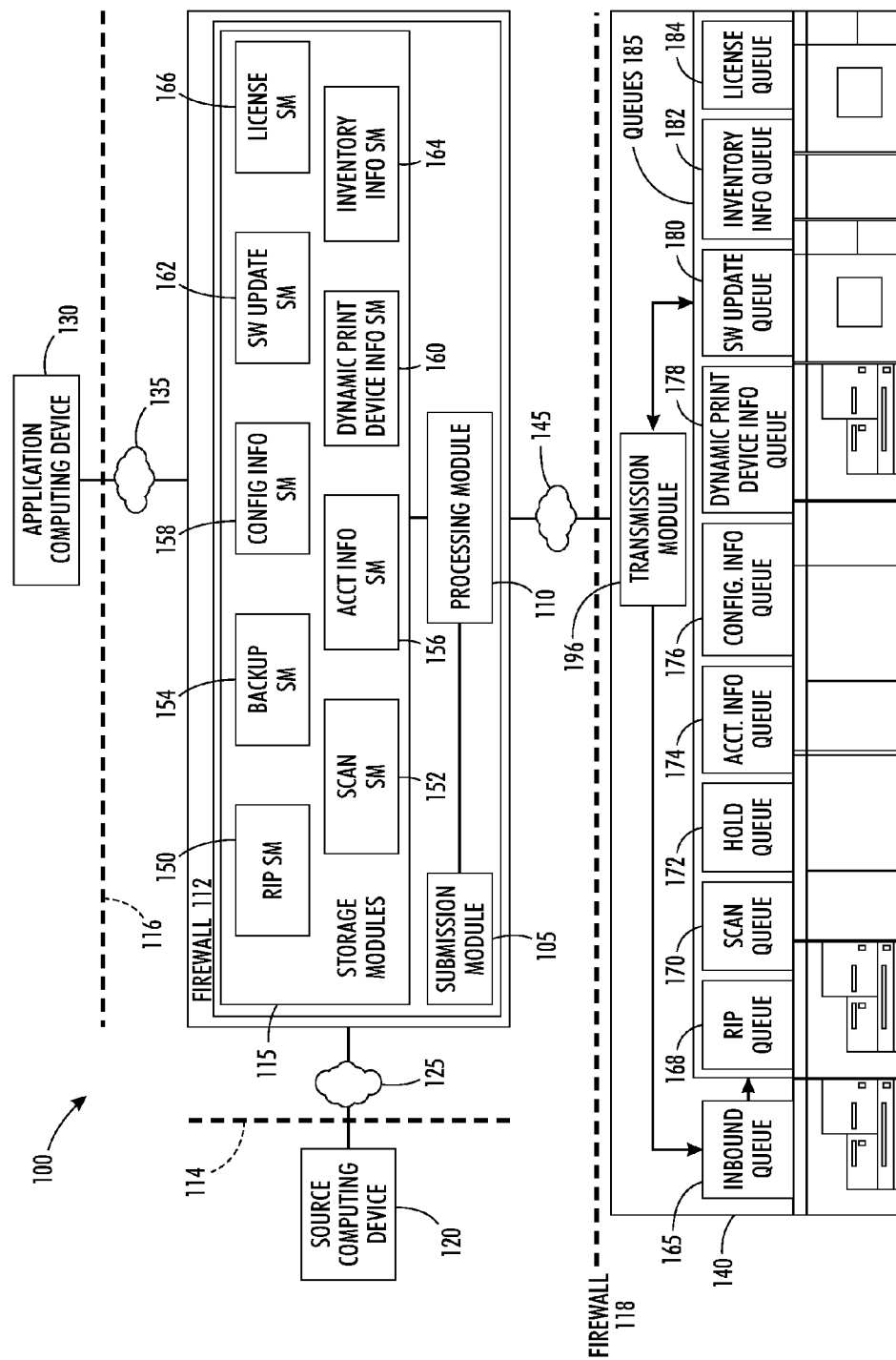
FIGS. 1A and 1B depict a block diagram of an exemplary cloud administration system according to an embodiment.

The following terms shall have, for the purposes of this application, the respective meanings set forth below.

An "application computing device" is a computing device capable of sending information to and/or receiving information from a cloud administration system.

A "cloud administration system" refers to one or more physical and/or logical devices that operate as a shared resource for multiple remote print devices and/or computing devices. Logical devices in a cloud administration system may be accessed without any knowledge of the corresponding physical devices.

A "computing device" or a "processor" refers to a computer or other machine that performs one or more operations according to one or more programming instructions. Exemplary computing devices may include personal computers, servers, mobile communication devices and/or the like. An exemplary computing device or processor is described in reference to FIG. 4.

A "consumable" is an item that is utilized by a print device in the processing of a job, and whose inventory is depleted by such use. Exemplary consumables may include ink, paper, toner, wire for staples, envelopes, binding materials and/or the like.

A "firewall" is hardware and/or software used to protect a resource of a network from unauthorized external access.

"Inventory information" means information associated with the supply and/or usage of one or more inventory items.

An "inventory item" is a consumable and/or a part.

A "job" refers to a logical unit of work that is to be completed for a customer.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "module" is a component of a larger system, such as a cloud administration system.

An "operation" or a "print-related function" is a function that is performed on a print job. Exemplary operations may include raster image processing, formatting, stapling, collating, sorting, punching, binding and/or the like.

A "part" is a component of a print device that is not a consumable. Exemplary parts may include belts, rollers, toner assemblies and/or the like.

A "physical device" is a physical resource such as a computing device, a computer-readable storage medium and/or the like.

A "print job" refers to a job that can be processed by a print device. For example, a print job may include a job that is to be printed, scanned or otherwise processed by a print device.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "queue" is a data structure stored on a computer-readable medium and configured to temporarily store information including, but not limited to a print job, inventory information and/or the like.

The term "remote," as used herein with respect to computing devices and/or print devices, refers to devices that operate on different computer networks and/or computer networks operated by different entities. For example, a computing device is remote from a print device if the computing device is connected to a first LAN operated by a first entity and the print device is connected to a second LAN operated by a second entity.

A "resource" is a physical device comprising a processor and/or a storage medium. Exemplary resources may include a computing device, a processing device, a storage device and/or the like.

A "shared resource" is a resource that may be accessed and used by a plurality of other resources.

A "source computing device" is a computing device that is capable of transmitting one or more print jobs to a cloud administration system.

A "storage module" or "SM" is a computer-readable storage medium or portion thereof.

"Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

FIG. 1A illustrates an exemplary cloud administration system according to an embodiment. As illustrated by FIG. 1A, a cloud administration system 100 may include a submission module 105, a processing module 110 and one or more storage modules 115. The submission module 105 and/or one or more of the storage modules 115 may be in communication with the processing module 110. In an embodiment, all communication to or from the cloud administration system 100 may be through a firewall 112.

In an embodiment, a storage module 115 may correspond to an operation or type of operation to be performed on a print job, or it may correspond to the type of information it stores. For example, as illustrated by FIG. 1A, the storage modules 115 may include a raster image processing (RIP) storage module 150, a scan storage module 152, a backup storage module 154, an accounting information storage module 156, a configuration information storage module 158, a dynamic print device information storage module 160, a software update storage module 162, an inventory information storage module 164, a license storage module 166 and/or the like. Storage modules 115 are discussed in more detail below.

In an embodiment, a cloud administration system 100 may be in communication with one or more source computing devices 120. A source computing device 120 may be located remotely from the cloud administration system 100. In an embodiment, all source computing devices 120 may be located remotely from the cloud administration system 100. In an embodiment, a source computing device 120 may communicate with a cloud administration system 100 through a plurality of firewalls. For example, a communication from a source computing device 120 to a submission module 105 may pass through a firewall 114 associated with the source computing device and the firewall 112 associated with the cloud administration system 100.

In an embodiment, a source computing device 120 may communicate directly with a cloud administration system 100 over a network 125. In an embodiment, the network 125 may be operated by an entity. An entity may be a corporation, an organization, a group, an individual and/or the like. In an embodiment, a plurality of source computing devices 120 may communicate with the cloud administration system 100 over one or more networks.

In an embodiment, a cloud administration system 100 may be in communication with one or more application computing devices 130. An application computing device 130 may be in communication with the processing module 110 and/or one or more storage modules 115. In an embodiment, an application computing device 130 may communicate with the cloud administration system 100 through a plurality of firewalls. For example, a communication from an application computing device 130 to a processing module 110 may pass through a firewall 116 associated with the application computing device and the firewall 112 associated with the cloud administration system 100.

In an embodiment, an application computing device 130 may be located remotely from the cloud administration system 100. In an embodiment, each application computing device 130 may be located remotely from the cloud administration system 100. In an alternate embodiment, an application computing device 130 may be a component of the cloud administration system 100.

An application computing device 130 may communicate with the cloud administration system 100 over a network 135. In an embodiment, an application computing device 130 may communicate directly with a submission module 105 over a network 135. In an embodiment, an application computing device 130 may communicate with a submission module 105 through one or more firewalls.

An application computing device 130 may be located remotely from a source computing device 120. In an embodiment, each application computing device 130 may be located remotely from each source computing device 120. In an embodiment, the network 135 over which an application computing device 130 may communicate with a cloud administration system 100 may be operated by a different entity than that which operates a network over which a source computing device 120 may communicate with the cloud administration system.

In an embodiment, a cloud administration system 100 may be in communication with one or more print devices 140. A print device 140 may be located remotely from the cloud administration system 100 and may communicate with the cloud administration system over one or more networks 145. In an embodiment, each print device 140 may be located remotely from the cloud administration system 100.

In an embodiment, a print device 140 may communicate with a cloud administration system 100 through a plurality of firewalls. For example, a communication from a print device 140 to a cloud administration system 100 may pass through a firewall 118 associated with the print device and the firewall 112 associated with the cloud administration system 100.

In an embodiment, a print device 140 may be located remotely from a source computing device 120 and an application computing device 130. In an embodiment, each print device 140 may be located remotely from each source computing device 120 and each application computing device 130. In an embodiment, the network 145 over which a print device 140 may communicate with a cloud administration system 100 may be operated by an entity that is different that that which operates a network over which a source computing device 120 may communicate with the cloud administration system and/or a network over which an application computing device 130 may communicate with the cloud administration system.

In an embodiment, a print device 140 may have one or more queues 185 that may be inbound and/or outbound queues. Although inbound and outbound queues are discussed as being separate queues, it is understood that an inbound queue may perform inbound and outbound queue functions, and that an outbound queue may perform outbound and inbound functions.

In an embodiment, a print device 140 may have an inbound queue 165, such as a spooler and/or the like. An inbound spooler may be a queue that receives, stores, schedules and/or requests printing of a print job. In an embodiment, a print device 140 may have one or more outbound queues 185. An outbound queue may store print jobs and/or print device information until the print device transmits these print jobs and/or print device information. For example, as illustrated by FIG. 1A, a print device may have a RIP queue 168, a scan queue 170, a hold queue 172, an accounting information queue 174, a configuration information queue 176, a dynamic print device information queue 178, a software update queue 180, an inventory information queue 182, a license queue 184 and/or the like. Queues 185 are discussed in more detail below.

In an embodiment, a print device 140 may have a transmission module 196. A transmission module may be in communication with one or more queues 185. A transmission module 196 may be configured to transmit data from a print device 140 to a computing device, another print device and/or the like. In an embodiment, a transmission module 196 may be in communication with a cloud administration system 100. For example, a transmission module 196 may be in communication with a processing module 110 of a cloud administration system 100.

In an embodiment, a source computing device 120, an application computing device 130 and a print device 140 may not communicate directly with one another. As illustrated by FIG. 1A, the source computing device 120, the application computing device 130 and the print device 140 may communicate indirectly via a cloud administration system 100.

Figure 1B:
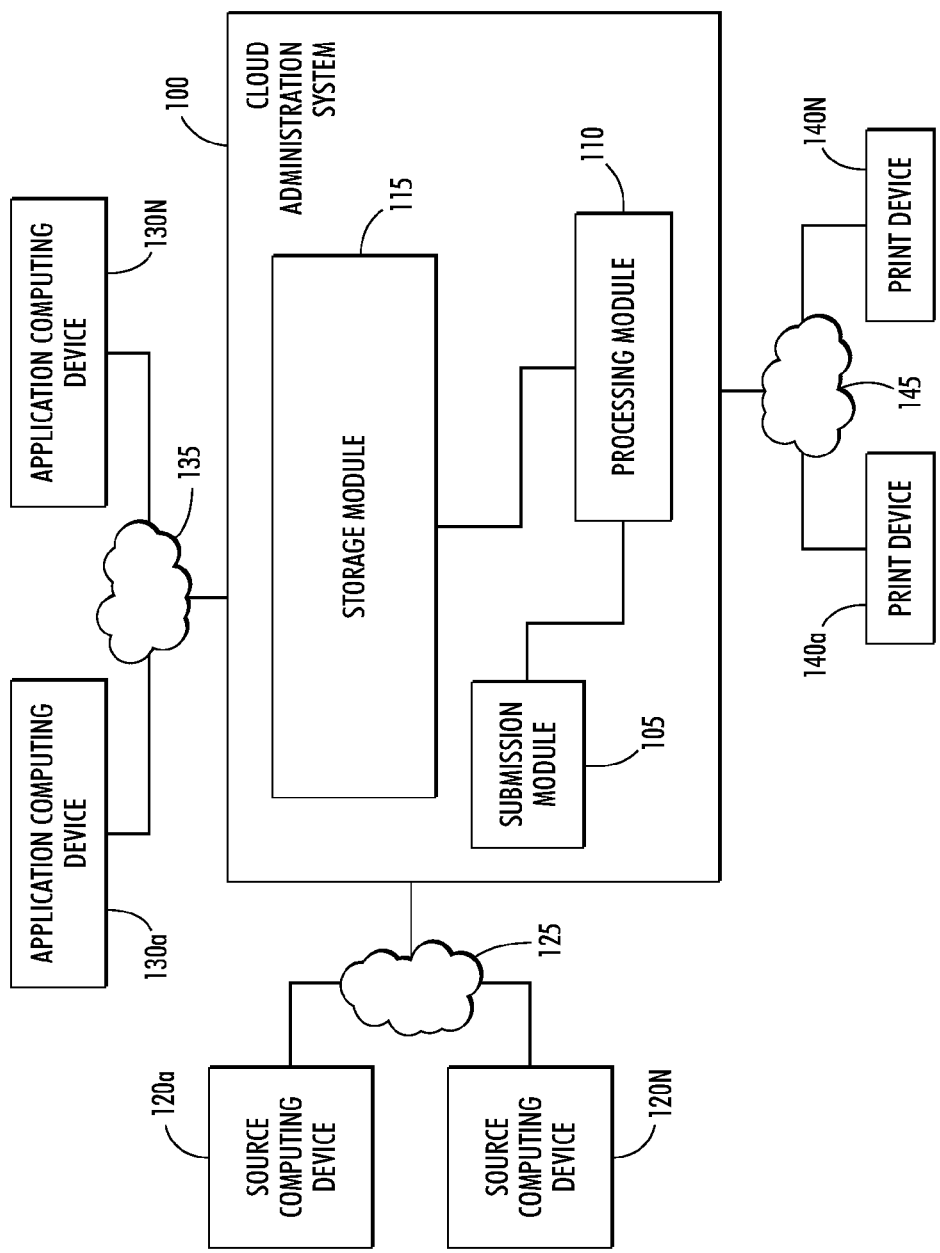

FIG. 1B depicts an exemplary cloud administration system according to an embodiment. As illustrated by FIG. 1B, a cloud administration system 100 may communicate with more than one source computing device 120*a*-N, application computing device 130*a*-N and/or print device 140*a*-N.

Figure 2:
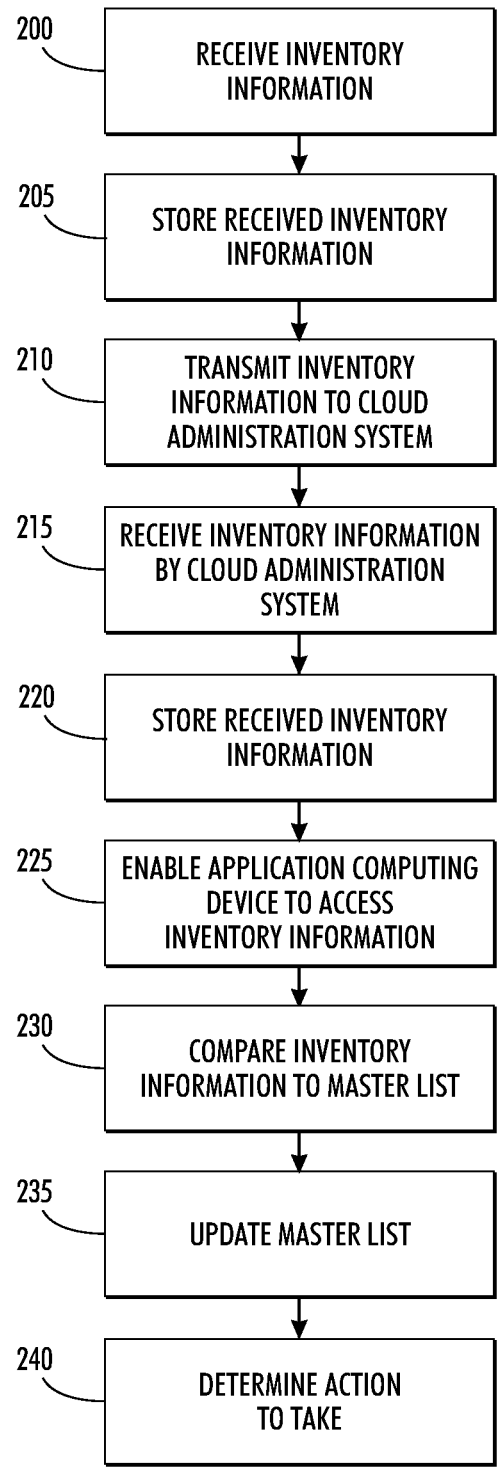
FIG. 2 illustrates an exemplary method of monitoring inventory information according to an embodiment.

FIG. 2 illustrates an exemplary method of monitoring inventory information according to an embodiment. In an embodiment, one or more inventory items may be associated with inventory information. Inventory information may include identification information that uniquely identifies an inventory item, such as a unique identifier, a barcode, a serial number, and/or the like.

In an embodiment, inventory information may include information regarding the condition of the inventory item. For example, inventory information may include an indication of whether the inventory item is in good condition, is in poor condition, is defective and/or the like. Inventory information may include usage information associated with an inventory item. For example, inventory information may include an indication as to whether the inventory item is the last inventory item at a particular location.

In an embodiment, a print device may receive 200 inventory information associated with an inventory item. A print device may receive 200 inventory information associated with an inventory item before the inventory item is installed or otherwise used by the print device. For example, before a new printhead assembly is installed in a print device, the print device may receive 200 inventory information associated with the printhead assembly.

In an embodiment, a print device may receive 200 inventory information from a scanner associated with the print device. The scanner may scan a barcode or other machine-readable information associated with an inventory item and may transmit the received inventory information to the print device. In an embodiment, a print device may receive 200 inventory information from a user via a user interface of the print device. For example, a user may enter a serial number or other identifier associated with an inventory item via a print device user interface.

In an embodiment, a print device may store 205 received inventory information. In an embodiment, the print device may store 205 the inventory information in a queue associated with a print device, such as an inventory queue.

In an embodiment, a print device may transmit 210 the inventory information to a cloud administration system periodically or intermittently. For example, a print device may transmit 210 inventory information to a cloud administration system at regular intervals, such as daily. In an alternative embodiment, inventory information may be transmitted 210 to a cloud administration system in response to a request for inventory information from a cloud administration system or other computing device in communication with the print device.

In an embodiment, inventory information may be transmitted 210 from a queue of a print device. For example, inventory information may be transmitted 210 from an inventory information queue of a print device, such as the inventory information queue 182 illustrated in FIG. 1A. Alternatively, inventory information may be transmitted 210 from a transmission module of a print device. For example, inventory information may be transmitted 210 from an inventory queue of a print device to a transmission module of a print device. The inventory information may be transmitted 210 from the transmission module. In an embodiment, inventory information may be retrieved from a queue by a transmission module, and then transmitted 210 by the transmission module.

In an embodiment, inventory information may be received 215 by a cloud administration system. In an embodiment, inventory information may be received 215 by a cloud administration system from a print device. In an alternate embodiment, inventory information may be received 215 from a source computing device. Inventory information may be scanned to a source computing device via a scanner in communication with the source computing device. Alternatively, inventory information may be received by a source computing device from a user. For example, a user may enter inventory information on a source computing device via a keyboard, mouse or other input means. The source computing device may transmit the received inventory information to a cloud administration system. In an embodiment, the source computing device may transmit the received inventory information to a processing module associated with the cloud administration system.

In an embodiment, a cloud administration system may store 220 the received inventory information. For example, the processing module may store 220 the received inventory information in a storage module associated with the cloud administration system. The cloud administration system may have one or more storage modules that are dedicated to storing inventory information. For example, a cloud administration system may have an inventory storage module such as the inventory storage module 164 illustrated in FIG. 1A. Inventory information that is received by the cloud administration system may be stored 220 in one or more of these dedicated storage modules.

In an embodiment, received inventory information may be stored 220 along with an indicator of its source. For example, a customer or entity associated with the print device from which the inventory information was received may be stored with the inventory information. As another example, a location associated with the print device from which the inventory information was received may be stored with the inventory information.

In an embodiment, the cloud administration system may 225 enable an application computing device to access at least a portion of inventory information from a storage module. In an embodiment, an application computing device may access inventory information to determine whether additional inventory items should be ordered or provided to a customer.

In an embodiment, inventory information may be compared 230 to a master list of inventory information for a customer. The master list of inventory information may include a number of inventory items in possession of the customer, a number of inventory items used by the customer and/or the like. In an embodiment, a master list may be stored on the cloud administration system. The cloud administration system may compare 230 inventory information to the master list. In an embodiment, a master list may be stored on one or more application computing devices. An application computing device may access the inventory information from the inventory storage module and compare 230 the inventory information with the master list. The master list may be updated 235 accordingly.

For example, inventory information may include a serial number associated with an ink cartridge that Customer A is installing in its printer. Table 1 illustrates an exemplary master list that may be associated with the inventory items in possession of Customer A. Different or alternate master lists may be used within the scope of this disclosure.

TABLE 1

| Inventory Item | Identifier | Used? |
| --- | --- | --- |
| Ink cartridge | SLRG324 | Yes |
| Ink cartridge | GHQK001 | Yes |
| Ink cartridge | VMWO294 | Yes |
| Ink cartridge | RQJG658 | Yes |
| Transfer belt | XHJ32 | No |

In an embodiment, the inventory information that is stored in the cloud administration system may be associated with the ink cartridge having the "RQJG658" identifier. For example, Customer A may replace a print device's ink cartridge with the RQJG658 ink cartridge, and may scan the RQJG658 ink cartridge prior to installing it. An application computing device and/or cloud administration system may retrieve the inventory information associated with the RQJG658 ink cartridge from the master list illustrated in Table 1. In an embodiment, an application computing device and/or cloud administration system may check that the inventory item is included on the master list for the customer. If so, the application computing device and/or cloud administration system may update 235 the master list to reflect the part being used. For example, the master list illustrated in Table 1 may be modified as shown in Table 2 to indicate that the RQJG658 ink cartridge is no longer available.

TABLE 2

| Inventory Item | Identifier | Used? |
| --- | --- | --- |
| Ink cartridge | SLRG324 | Yes |
| Ink cartridge | GHQK001 | Yes |
| Ink cartridge | VMWO294 | Yes |
| Ink cartridge | RQJG658 | No |
| Transfer belt | XHJ32 | No |

In an embodiment, an application computing device and/or cloud administration system may analyze the master list to determine 240 whether an action should be taken. In an embodiment, actions may include notifying a customer that inventory of a certain inventory item is low, initiating an order for one or more inventory items and/or the like. In an embodiment, an application computing device and/or cloud administration system may determine 240 that an action should be taken if an inventory level falls below a threshold value. For example, an application computing device may send a notification to a customer if an inventory level falls below a threshold value. For instance, an application computing device may send a notification to a customer if an inventory levels falls below 30% of its initial level. Similarly, an application computing device and/or cloud administration system may submit an order for an inventory item if an inventory level falls below a threshold value.

As an example, an application computing device and/or cloud administration system may analyze the master list shown in Table 2 and determine that all of the ink cartridges that have been assigned to Customer A have been used. A notification may be sent to Customer A that it should replenish its supply of ink cartridges. In another embodiment, an order for additional ink cartridges may be automatically placed.

Figure 3:
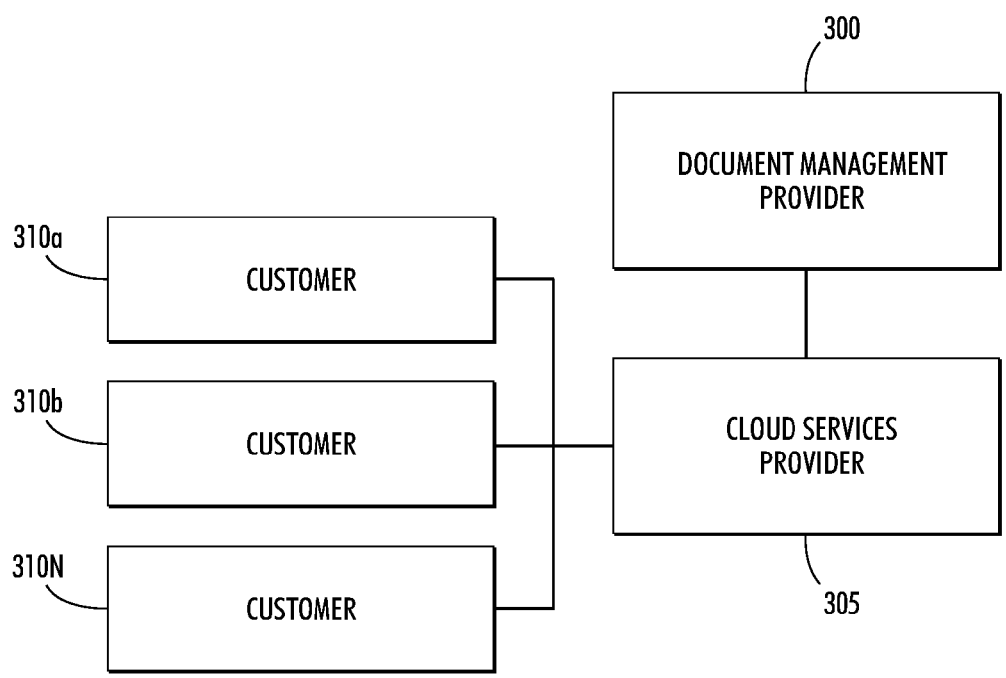
FIG. 3 illustrates an exemplary implementation of a cloud administration system according to an embodiment

FIG. 3 illustrates an exemplary implementation of a cloud administration system according to an embodiment. A document management provider 300 may contract with a cloud services provider 305 to provide cloud services to the document management provider's customers 310a-N. A document management provider 300 may be an entity that supplies, manages and/or maintains print devices, processes print jobs and/or performs other document management services. A cloud services provider 305 may operate and/or maintain a cloud administration system to provide cloud services. Cloud services may include applications that are accessed remotely on demand from a cloud services provider that hosts the applications. Cloud services may include applications for document management, document processing, account management, print device configuration, document retention and backup, inventory management and/or the like.

In an embodiment, a computing device operated by a customer 310a-N may communicate directly with a cloud administration system. For example, a print device utilized by a customer 310a-N at the customer's location may send inventory information to a cloud administration system operated by a cloud services provider 305. The cloud administration system may store the inventory information. In an embodiment, an application computing device operated by the document management provider 300 or another entity with whom the document management provider has contracted, may access inventory information from the cloud administration system.

For example, a cloud administration system may store inventory information associated with print devices operated by a customer 310a-N. The document management provider 300 may access the inventory information via an application computing device from the cloud administration system in order to monitor and track inventory levels for the customer 310a-N. In an alternate embodiment, an inventory management service with whom the document management provider 300 contracts may access the inventory information via an application computing device from the cloud administration system in order to monitor and track inventory levels for the customer 310a-N.

Figure 4:
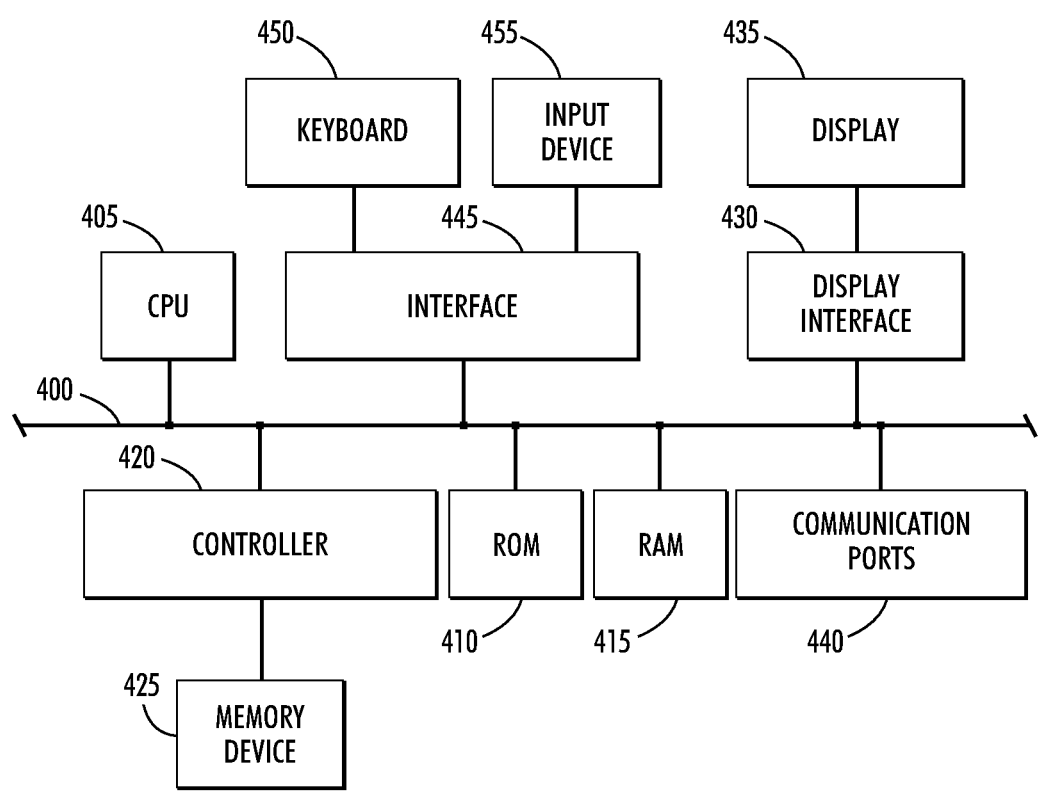
FIG. 4 depicts a block diagram of exemplary internal hardware that may be used to contain or implement program instructions according to an embodiment.

FIG. 4 depicts a block diagram of exemplary internal hardware that may be used to contain or implement program instructions, such as the process steps discussed above in reference to FIG. 2, according to embodiments. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an exemplary processing device, computing device or processor as such terms are used within this disclosure. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible computer-readable storage medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. Communication with external devices, such as a print device, may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A cloud administration system for managing inventory information for one or more remote print devices, the cloud administration system comprising:
   a processing module in communication with a plurality of print devices, wherein the processing module is located remotely from each of the plurality of print devices; and
   a storage module in communication with the processing module,
   wherein the processing module is configured to:
      receive inventory information associated with a print device inventory item associated with a print device of the plurality of print devices,
      store the inventory information in the storage module, and
      enable an application computing device to access the inventory information from the storage module,
   wherein the cloud administration system operates as a shared resource for each of the plurality of print devices and the application computing device.

2. The system of claim 1, wherein the processing module is further configured to receive inventory information from the print device.

3. The system of claim 1, wherein the processing module is further configured to receive inventory information from a source computing device that is located remotely from the processing module.

4. The system of claim 1, wherein the inventory information comprises information associated with a consumable of the print device.

5. The system of claim 1, wherein the inventory information comprises information associated with a part of the print device.

6. A system for managing inventory information for one or more remote print devices, the system comprising:
   a cloud administration system comprising:
      a processing module in communication with a plurality of print devices, wherein the processing module is located remotely from each of the plurality of print devices, and
      a storage module in communication with the processing module,
      wherein the processing module is configured to:
         receive inventory information associated with a print device inventory item for use in a print device of the plurality of print devices, and
         store the inventory information in the storage module; and
   an application computing device in communication with the cloud administration system, wherein the application computing device is configured to:

access the inventory information from the storage module of the cloud administration system, and
update a master list of inventory information associated with a customer based on the accessed inventory information,
wherein the application computing device is located remotely from the cloud administration system,
wherein the cloud administration system operates as a shared resource for each of the plurality of print devices and the application computing device.

7. The system of claim 6, wherein the processing module is further configured to receive inventory information from the print device.

8. The system of claim 6, wherein the processing module is further configured to receive inventory information from a source computing device that is located remotely from the processing module.

9. The system of claim 6, wherein the inventory information comprises information associated with a consumable of the print device.

10. The system of claim 6, wherein the inventory information comprises information associated with a part of the print device.

11. The system of claim 6, wherein the application computing device is further configured to:
perform an action based on the updated master list.

12. The system of claim 6, wherein the application computing device is further configured to:
determine, based on the updated master list, whether an inventory level is below a threshold value; and
in response to the inventory level being below a threshold value, notify a customer.

13. The system of claim 6, wherein the application computing device is further configured to:
determine, based on the updated master list, whether an inventory level is below a threshold value; and
in response to the inventory level being below a threshold value, submitting an order for one or more print device inventory items for which the inventory level is below the threshold value.

\* \* \* \* \*